US006592321B2

(12) United States Patent
Bönker et al.

(10) Patent No.: US 6,592,321 B2
(45) Date of Patent: Jul. 15, 2003

(54) CONTROL AND GUIDING DEVICE FOR MANUALLY OPERATING A HANDLING UNIT, AND MODULAR CONSTRUCTION KIT FOR MAKING SUCH DEVICES OF DIFFERENT CONFIGURATION

(75) Inventors: Thomas Bönker, Unna (DE); Klaus-Dieter Gabriel, Hagen (DE); Uwe Lichtenvort, Essen (DE)

(73) Assignee: Demag Cranes & Components GmbH, Wetter (DE)

( * ) Notice: Subject to any disclaimer, the term of this patent is extended or adjusted under 35 U.S.C. 154(b) by 44 days.

(21) Appl. No.: 09/920,100

(22) Filed: Aug. 1, 2001

(65) Prior Publication Data

US 2002/0018708 A1 Feb. 14, 2002

Related U.S. Application Data

(60) Provisional application No. 60/260,578, filed on Jan. 8, 2001.

(30) Foreign Application Priority Data

Aug. 3, 2000 (DE) ........................................ 100 39 330

(51) Int. Cl.[7] ................................................ B65G 47/90

(52) U.S. Cl. ......................... 414/626; 414/618; 901/31; 212/285; 212/332; 212/334

(58) Field of Search ................................ 414/626, 618; 901/31; 212/332, 334, 285

(56) References Cited

U.S. PATENT DOCUMENTS

| | | | | | |
|---|---|---|---|---|---|
| 2,535,961 | A | * | 12/1950 | Schatt | 212/285 |
| 4,668,154 | A | * | 5/1987 | Ueno et al. | 414/607 |
| 4,708,574 | A | * | 11/1987 | Conboy et al. | 414/591 |
| 6,354,644 | B1 | * | 3/2002 | Zaguroli, Jr. et al. | 294/67.22 |

FOREIGN PATENT DOCUMENTS

| | | |
|---|---|---|
| EP | 0 586 029 B1 | 3/1994 |

* cited by examiner

*Primary Examiner*—Steven A. Bratlie
(74) *Attorney, Agent, or Firm*—Henry M. Feiereisen

(57) ABSTRACT

A device for manually maneuvering a handling unit, includes a mounting structure for attachment to a handling unit which is operated through actuation of a control mechanism connected to the mounting structure. A handle frame is connectable to the mounting structure and includes a cross member and a pair of elongate grip elements detachably coupled to the axial ends of the cross member which is releasably attached to the mounting structure. The cross member and the grip elements can be selected from a plurality of cross members and grip elements of varying lengths to thereby establish a construction kit that allows construction of handle frames of varying configuration.

18 Claims, 6 Drawing Sheets

CONTROL AND GUIDING DEVICE FOR MANUALLY OPERATING A HANDLING UNIT, AND MODULAR CONSTRUCTION KIT FOR MAKING SUCH DEVICES OF DIFFERENT CONFIGURATION

CROSS-REFERENCES TO RELATED APPLICATIONS

This application claims the benefit of prior filed provisional application, Application No. 60/260,578, filed Jan. 8, 2001, pursuant to 35 U.S.C. 119(e).

This application claims the priority of German Patent Application Ser. No. 100 39 330.6, filed Aug. 3, 2000, the subject matter of which is incorporated herein by reference.

BACKGROUND OF THE INVENTION

The present invention relates to a device for manually controlling and guiding a handling unit of a type having a drive, in particular a lifting unit. The present invention also relates to a modular construction kit for making such control and guiding devices.

European Pat. No. EP 0 586 029 B1 discloses a hoist with a lifting unit that moves a traction member up and down. Disposed at the free end of the traction member is a device for controlling and guiding a load-receiving member, which is fastened directly to the device. The device has a housing, which is formed with a horizontal grip that can be grasped by an operator's hand so as to guide the load-receiving member. Arranged in the housing are two switching push rods as switching elements which are connected electrically to the control mechanism for the lifting unit and can be actuated from outside by means of a rocker. The grip is hereby so positioned that the thumb of the operator's hand, when grabbing the grip, can easily reach the rocker.

This conventional control and guiding device suffers shortcomings because its design is unsuitable for use with a multiplicity of handling units, such as manipulators, and it cannot be adjusted to ergonomically changing situations, when operators of different heights use the device.

It would therefore be desirable and advantageous to provide an improved device for manual controlling and guiding a handling unit, which obviates prior art shortcomings and is simple in structure while yet can be suited to a wide range of different handling units and to individual needs of the operator as well as to ergonomic conditions and different lifting heights.

SUMMARY OF THE INVENTION

According to one aspect of the present invention, a device for manually maneuvering a handling unit, includes a mounting structure configured for attachment to a handling unit; a control mechanism connected to the mounting structure and including keys, actuated from outside, for activating a movement of the handling unit; and a handle frame connectable to the mounting structure and configured to allow an operator to actuate at least one of the keys with a thumb, wherein the handle frame includes a cross member having opposite axial ends, a pair of elongate grip elements, one of the grip elements extending transversely to the cross member and having one end detachably connected to one of the axial ends, and the other of the grip elements extending transversely to the cross member and having one end detachably connected to other one of the axial ends, and a fastener for releasably attaching the cross member to the mounting structure, wherein the cross member and the grip elements are selected from a plurality of cross members and grip elements of varying lengths to thereby establish a construction kit to allow construction of the handle frame with a desired configuration, wherein the fastener is configured to allow displacement of the cross member in axial direction and thereby effect a positional adjustment of the grip elements with respect to the keys, before securely fixing the cross member to the mounting structure.

Through modular configuration of the handle frame, e.g. through provision of cross members and grip elements of different lengths, a construction kit can be established by which handle frames of different design can be realized so as to suit the need at hand. Adaptation to a wide range of different requirements is thus ensured by fabricating handle frames from components of different lengths of the modular construction kit, whereby the components are essentially grip elements and cross members, with at least one cross member fastened releasably to the mounting structure of the device and connected at its free ends to a grip element. The lengths of the cross members and grip elements used for a handle frame determine the basic size of the handle frame. In addition, at least the position of a grip element can be adjusted relative to the keys of switching and/or touch elements, of the control mechanism, namely through longitudinal displacement of the cross member, before securement to the mounting structure.

In a simple configuration, the handle frame has a configuration of a handlebar with two grip elements, resembling a bicycle handlebar and fastened to an elongate mounting structure.

According to another feature of the present invention, the mounting structure is formed from a profiled hollow section which has open ends and an open long side which defines the backside of the mounting structure and can be closed by a lid. This simple and cost-efficient structure allows easy integration of diverse control mechanisms in the hollow section, i.e. there is no need for any further switchboxes or the like.

According to another feature of the present invention, the device may include at least one satellite control unit, which has some or all of the switching and/or touch elements and is slideably mounted to the mounting structure for displacement in transverse and longitudinal directions with respect to the mounting structure, whereby actuation of the control unit is realized via keys to thereby activate operating features of the handling unit. The use of such a control unit that may include all switching and/or touch elements, the device can be easily suited to the height of an operator.

In situations, when relatively heavy loads have to be moved, the handle frame may be composed of two cross members interconnected at the axial ends by the two grip elements, thereby establishing a closed handle frame which has a higher level of mechanical stability, whereby both cross members are fastened to the mounting structure.

Situations in which the grip elements are spaced far apart, the cross member is fastened releasably to two spaced-apart mounting structures in parallel relationship, which are connected to the handling unit. Apart from a greater level of stability of the device, the keys of the control mechanism on the mounting structures can easily be reached by both thumbs of the operator. The stability of the device can be further increased when the free ends of the two grip elements are fastened releasably to the two mounting structures, respectively.

According to another aspect of the present invention, a device for manually maneuvering a handling unit, includes at least two mounting structures arranged in side-by-side parallel disposition and configured for attachment to a handling unit, each of the mounting structures having incorporated therein a control mechanism which includes keys, actuated from outside, for activating a movement of the handling unit; and a closed planar handle frame connectable to the mounting structures and configured to allow an operator to actuate at least one of the keys with a thumb, wherein the handle frame includes a substantially horizontal first cross member having opposite axial ends, a pair of elongate grip elements in parallel relationship, one of the grip elements extending transversely to the first cross member and having one end detachably connected to one of the axial ends, and the other of the grip elements extending transversely to the first cross member and having one end detachably connected to other one of the axial ends, and a second cross member in parallel relationship to the first cross member and having axial ends, with one of the grip elements detachably connected with its other end to one of the axial ends of the second cross member, and the other of the grip elements detachably connected with its other end to other one of the axial ends of the second cross member; and connectors for detachably mounting the grip elements to the first and second cross members, each of the connectors having at least one protrusion for insertion in a complementary receptacle of the mounting structures, wherein the protrusion of one of the connectors projects in a same direction as the protrusion of each of the other connectors and extends in parallel relationship to the protrusion of each of the other connectors, wherein the cross members, the grip elements, the mounting structures and the connectors are selected from a plurality of cross members, grip elements, mounting structures and connectors of varying lengths to thereby establish a construction kit to allow construction of the handle frame with a desired configuration.

Also in this embodiment, through modular configuration of the handle frame, e.g. through provision of cross members and grip elements of different lengths, a construction kit can be established by which devices of different design can be realized so as to easily suit the need at hand, e.g. to adjust to operators of different height.

BRIEF DESCRIPTION OF THE DRAWING

Other features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
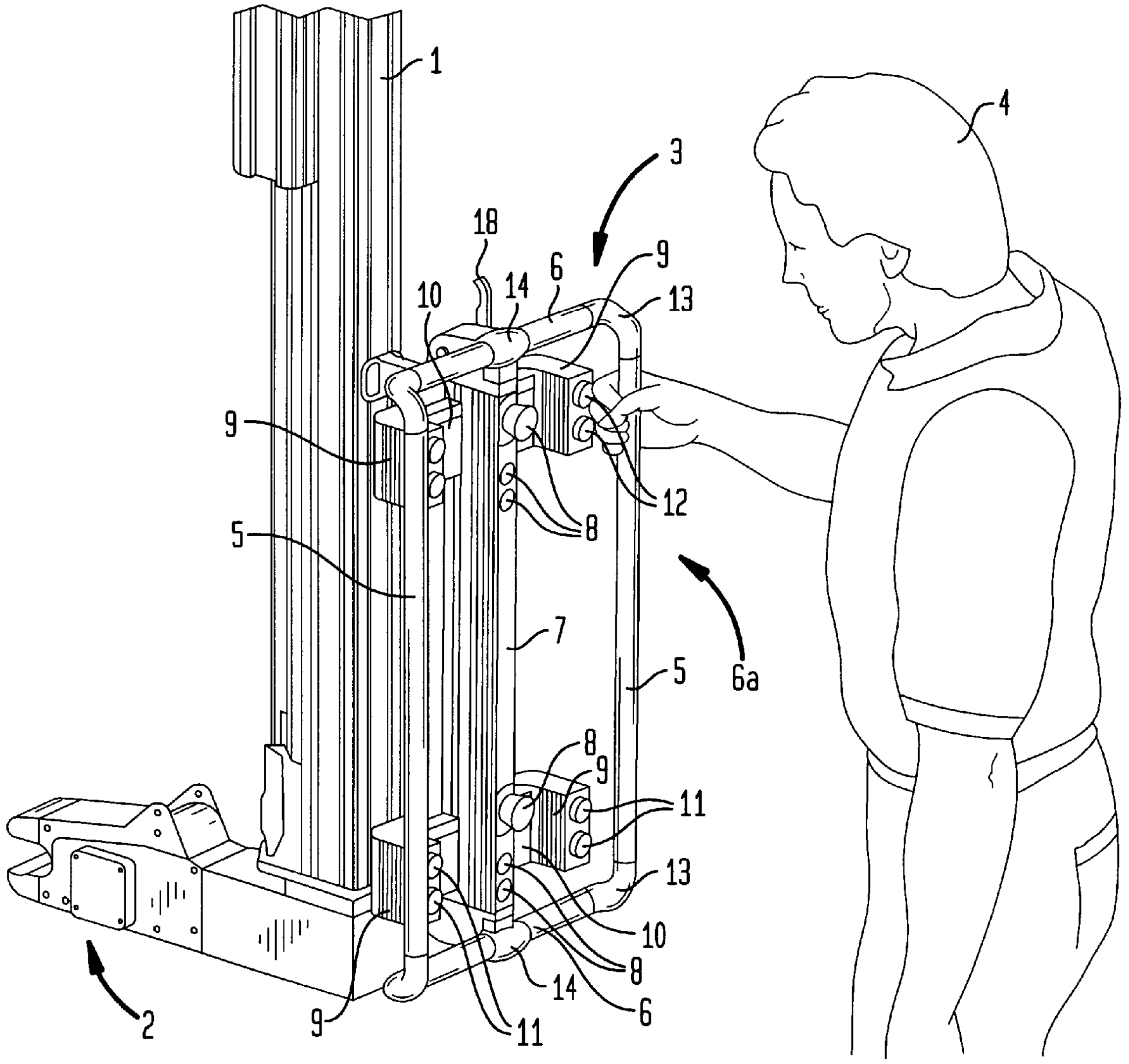
FIG. 1 is a perspective illustration of a first variation of a control and guiding device, according to the present invention, for attachment to a vertical mast of a handling unit.

Throughout all the figures, same or corresponding elements are generally indicated by same reference numerals.

Turning now to the drawing, and in particular to FIG. 1, there is shown a perspective illustration of a first variation of a control and guiding device, according to the present invention, generally designated by reference numeral 3, for attachment to a vertical mast 1 which forms part of a, not shown, handling unit and can be retracted and extended by means of a, not shown, drive. Mounted to the lower end of the vertical mast 1 is a load-receiving member 2 in the form of a gripper. The control and guiding device 3 is arranged on the vertical mast 1 at a location directed away from the load-receiving member 2 for actuation by an operator 4, and includes a handle frame, generally designated by reference numeral *6a*. The handle frame *6a* includes a pair of spaced-apart tubular grip elements 5 for grabbing by a hand of the operator 4 (in the nonlimiting example of FIG. 1, the right grip element 5 is grasped by the right hand of the operator 4).

At their opposite axial ends, the grip elements 5 are releasably interconnected by tubular cross members 6 via respective connectors 13 to thereby impart the handle frame *6a* with a closed and stable configuration. The cross members 6 of the handle frame *6a* are connected by retainers 14 to a mounting structure 7 which includes a plurality of switching and/or touch elements having keys 8 actuated from outside by the operator 4. The switching and/or touch elements are intended to control the drive for the mast 1 of the handling unit 3, in particular to retract and extend the load-receiving member 2. The mounting structure 7 is threadably engaged to the vertical mast 1 by means of, not shown, screws, and further supports two pairs of satellite-like control elements 9 which are mounted to the free ends of lateral carriers 10 received in complementary tracks of the mounting structure 7 so that the carriers 10 can be moved in a direction longitudinal of and transversely to the mounting structure 7 to thereby adjust the position of the control elements 9. The lower pair of control elements 9 is provided with switching and/or touch elements having keys 11, and the upper pair of control elements 9 is provided with switching and/or touch elements having keys 12 to allow optional adjustment from outside of operating features of the mast 1 with respect to inclination and height.

The mounting structure 7 is formed by a profiled hollow section having open ends and an open backside which is closeable by a metal strip, not shown. The open ends of the mounting structure 7 may be closed by the retainers 14 which are plugged into the open ends and subsequently fixed in place by screws. The hollow section may be made from extruded aluminum.

Persons skilled in the art will understand that the illustration of a mast 1 for attachment of the control and guiding device 3 is made by way of example only. Of course, it is conceivable to mount the device 3 to a cable as traction member, in which case the load-receiving member 2 is secured to the lower end of the cable.

The cross members 6 and grip elements 5 are components of a modular construction kit which includes a plurality of cross members 6 of different length, grip elements 5 of different length as well as mounting structures 7 of different configuration so as to be able to suit the dimension of the handle frame 6*a* to the situation at hand. Further components of the construction kit include the connectors 13 and the retainers 14. In this way, the handle frame 6*a* can be adapted ergonomically to the height of the operator 4, who then can easily grasp the handle frame 6*a* by the grip elements 5. As shown in the nonlimiting example of FIG. 1, the operator 4 can comfortably grab the right grip element 5 while being in a position to easily actuate the keys 12 of the upper right-hand control element by the thumb of the right operator's hand, without requiring the operator to release the grip element 5 for this purpose.

Of course, the construction kit should not be limited to the use of grip elements 5 and cross members 6 of same outer diameter, as illustrated in the drawing. Rather, the construction kit may also include grip elements 5 and cross members 6 of different outer diameter, and thus also connectors 13 and retainers 14 of different outer diameter to complement the grip elements and the connectors.

For ergonomic reasons, the connectors 13 for releasably coupling the ends of the grip elements 5 with the ends of the cross member 6 are made of generally L-shaped tube elements, with one leg being bent so that the grip elements 5 jut out relative to the cross member 6, when the grip elements 5 and the cross members 6 are inserted into respective ends of the connectors 13. Thus, the grip elements 5 extend in a common plane and the cross members 6 extend in a common plane, whereby the two planes are oriented parallel to one another. In this way, the grip elements 5 are arranged by a predetermined distance closer to the operator 4 than the cross members 6, to thereby provide more available space for the control elements 9.

A releasable connection between the grip elements 5 and the cross members 6 via the connectors 13 can be realized, for example, by means of a, not shown, latching mechanism or by means of, not shown, clamping pins.

The retainers 14 for connecting the handle frame 6*a* to the mounting structure 7 have a tubular configuration with a horizontal cylindrical through-opening for passage of the corresponding cross member 6 which thus is guided in the opening for displacement in a longitudinal manner. As a consequence, the entire handle frame 6*a* can be moved horizontally, thereby positionally adjusting the grip elements 5 in relation to the keys 11, 12. The retainers 14 form part of a releasable clamp mechanism to secure the cross members 6 firmly in place, once the proper position of the handle frame 6*a* is implemented.

As stated above, the assembly of the control and guiding device 3 according to the present invention is realized with components of a modular construction kit so as to suit the device 3 to the situation and need at hand. FIGS. 2 to 6 show further exemplified variations of such devices 3 of different configuration. Parts corresponding with those in FIG. 1 are denoted by identical reference numerals and not explained again.

Figure 2:
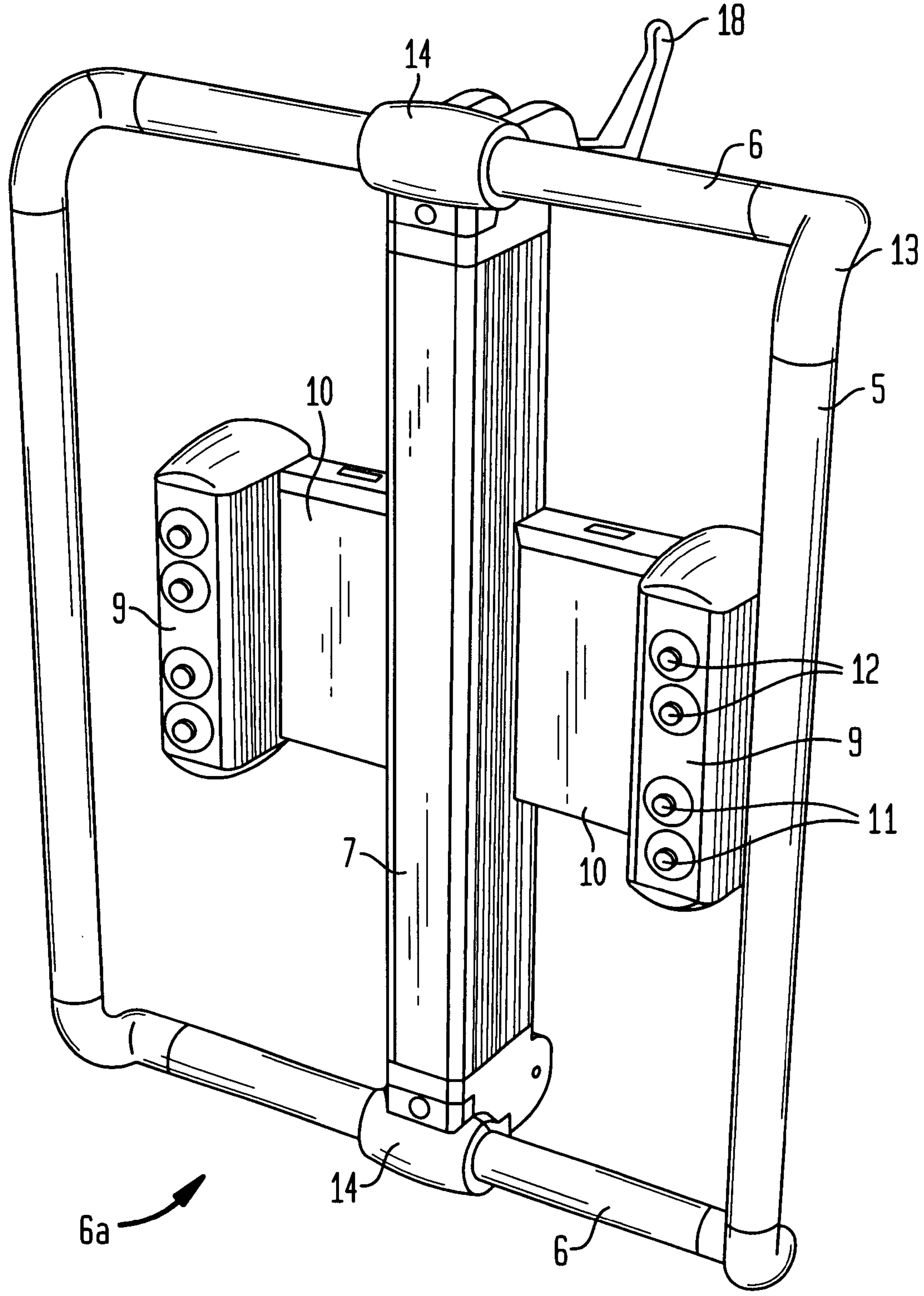
FIG. 2 is a perspective illustration of a second variation of a control and guiding device, according to the present invention, for attachment to a vertical mast of a handling unit.

In the embodiment of FIG. 2, provision is made for only a single pair of control elements 9, arranged at a central location of the mounting structure 7 which is devoid of any switching and/or touch elements and thus serves only as mounting.

Figure 3:
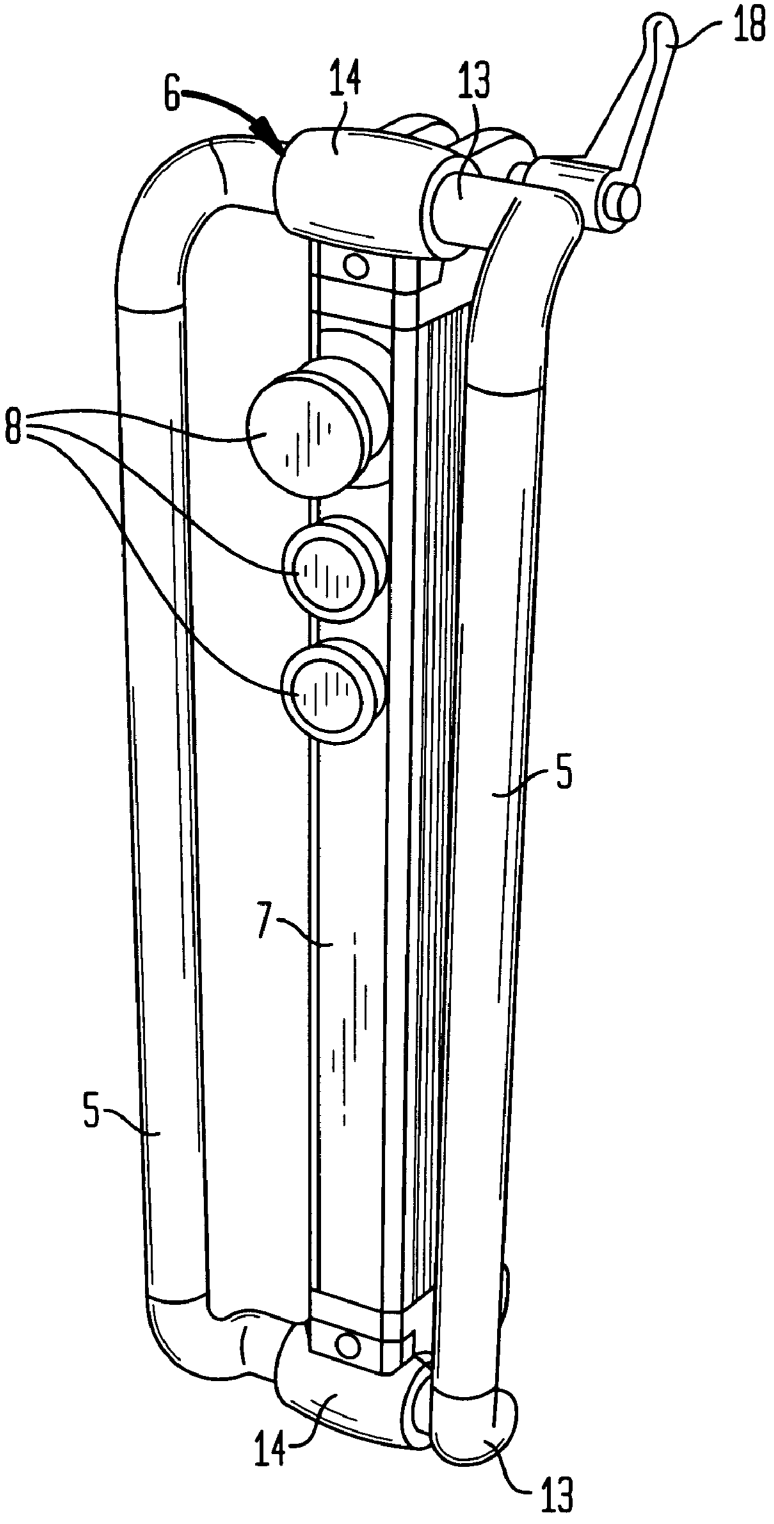
FIG. 3 is a perspective illustration of a third variation of a control and guiding device, according to the present invention, for attachment to a vertical mast of a handling unit.

FIG. 3 shows a variation of the device 3 which is devoid of a satellite control unit 9. The handle frame 6*a* is made of short cross members 6 and connected by retainers 14 to the mounting structure 7, which includes switching and/or touch elements with keys 8 for operation of the handling unit.

Figure 4:
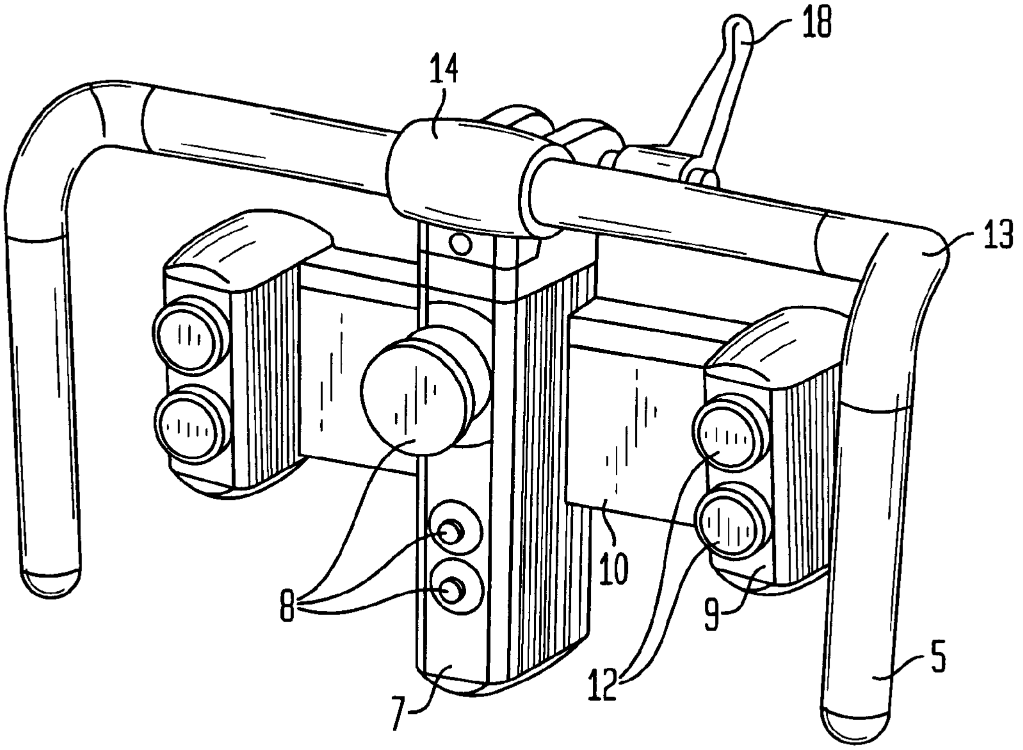
FIG. 4 is a perspective illustration of a fourth variation of a control and guiding device, according to the present invention, for attachment to a vertical mast of a handling unit.

FIG. 4 shows a variation of the device 3 with the handle frame 6*a* configured in the manner of a bicycle handlebar and thus including only a single cross member 6 and two downwardly extending grip elements 5. This configuration is shown by way of example only. Of course, the grip elements 5 can also be arranged on the cross member 6 to extend upwardly, or a configuration of the handle frame 6*a* is conceivable in which one grip element 5 extends downwards while the other grip element 5 extends upwards.

Figure 5:
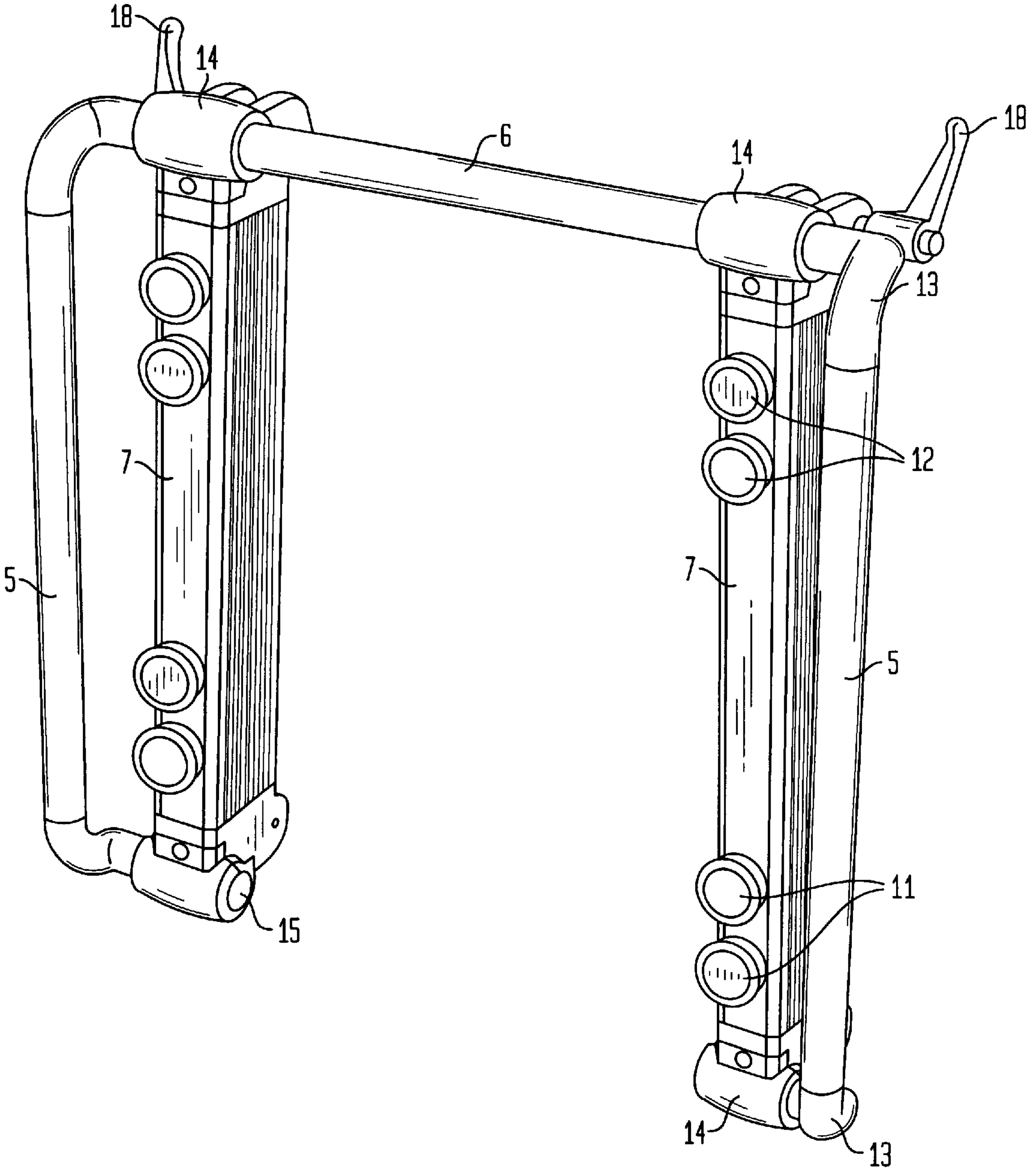
FIG. 5 is a perspective illustration of a fifth variation of a control and guiding device, according to the present invention, for attachment to a vertical mast of a handling unit.

FIG. 5 shows a variation of the device 3 with the handle frame 6*a* having one upper cross member 6 for attachment of two mounting structures 7 in spaced-apart parallel relationship. Attachment of the cross member 6 to the mounting structures 7 is realized by retainers 14, and attachment of the mounting structures 7 to the vertical mast 1 is effected by a suitable mounting plate, not shown, secured to the mast 1. In order to increase the stability of the handle frame 6*a*, the lower cross member distal ends of the grip elements 5 are respectively coupled to the mounting structures 7 by retainers 14, whereby each retainer 14 receives a stub-like cross member for insertion into the confronting end of a respective one of the connectors 13.

Figure 6:
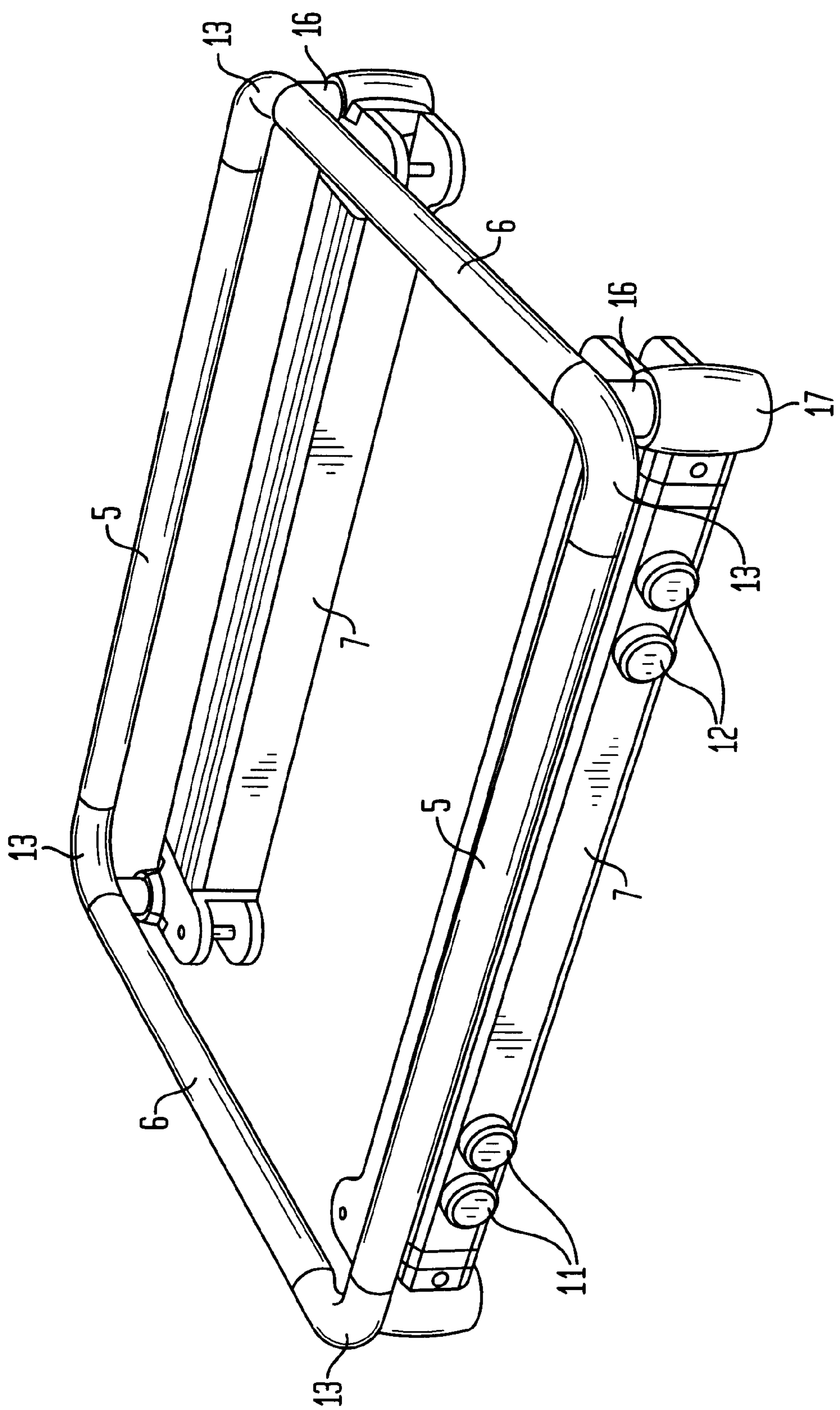
FIG. 6 is a perspective illustration of a sixth variation of a control and guiding device, according to the present invention, for attachment to a vertical mast of a handling unit.

FIG. 6 shows a variation of the device 3, again using two parallel mounting structures 7, in a manner similar to the embodiment in FIG. 5. In this embodiment, the handle frame 6*a* has a closed configuration in which the two grip elements 5 and the two cross members 6 are located in a single common plane. The connectors 13 are hereby configured in the form of an elbow with a protrusion 16 in the form of a cylindrical stub projecting downwards away from the handle frame 6*a* for releasable insertion in a complementary receptacle 17 of the mounting structures 7. The protrusions 16 may be fixed in place in the receptacles by means of a screw or like fastener.

Persons skilled in the art will understand that it is also possible to integrate switching and/or touch elements, in particular emergency switches (e.g. a dead man's switch) directly in the handle frame 6*a*.

As further shown in FIGS. 1 to 6, the handle frame 6*a* can be attached to the vertical mast 1 by the retainers 14 via a horizontal pivot axis about which the handle frame 6*a* can pivot. It is hereby conceivable to mount the handle frame 6*a* in such a manner that the lower attachment of the handle frame 6*a* can pivot about a horizontal axis, while the upper attachment of the handle frame 6*a* can be disengaged from the vertical mast 1 through operation of a clamping element 18 so that the handle frame 6*a* can be simply swung downwards to clear access to the backside of the mounting structure 7, for example, for easy replacement of electric cables as well as pneumatic lines and reconnection thereof. As a result, installation and maintenance of the device 3 are greatly simplified. Furthermore, it is also possible for the cables to be routed through the cross members 6 to the satellite control elements 9.

While the invention has been illustrated and described as embodied in a control and guiding device for manually operating a handling unit, and modular construction kit for making such devices of different configuration, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A device for manually maneuvering a handling unit, comprising:

a mounting structure configured for attachment to a handling unit;

a control mechanism connected to the mounting structure and including keys, actuated from outside, for activating a movement of the handling unit; and a handle frame connectable to the mounting structure and configured to allow an operator to actuate at least one of the keys with a thumb, wherein the handle frame includes a cross member having opposite axial ends, a pair of elongate grip elements, one of the grip elements extending transversely to the cross member and having one end detachably connected to one of the axial ends, and the other of the grip elements extending transversely to the cross member and having one end detachably connected to other one of the axial ends, and fastening means for releasably attaching the cross member to the mounting structure, wherein the cross member and the grip elements are selected from a plurality of cross members and grip elements of varying lengths to thereby establish a construction kit to allow construction of the handle frame with a desired configuration, wherein the fastening means includes a fastener configured to allow displacement of the cross member in axial direction and thereby effect a positional adjustment of the grip elements with respect to the keys, before securely fixing the cross member to the mounting structure.

2. The device of claim 1, wherein the mounting structure is made of a profiled hollow section having open axial ends and an open long side which defines a backside of the mounting structure, wherein the mounting structure includes a lid configured to close the open long side.

3. The device of claim 2, wherein the lid is a metal strip.

4. The device of claim 1, wherein the control mechanism is integrated in the mounting structure.

5. The device of claim 1, wherein the control mechanism is part of a satellite control unit slideably fastened to the mounting structure for displacement in transverse and longitudinal directions with respect to the mounting structure and having keys for activating operating features of the handling unit.

6. The device of claim 1, wherein the handle frame has a second said cross member for interconnecting the grip elements at their other ends, and second said fastening means for releasably attaching the second cross member to the mounting structure.

7. The device of claim 1, and further comprising a second said mounting structure, said two mounting structures arranged in parallel relationship, wherein the cross member is releasably secured to the two mounting structures.

8. The device of claim 7, wherein the one grip element is releasably secured with its other end to one of the mounting structures, and the other grip element is releasably secured with its other end to the other one of the mounting structures.

9. A device for manually maneuvering a handling unit, comprising:

at least two mounting structures arranged in side-by-side parallel disposition and configured for attachment to a handling unit, each of the mounting structures having incorporated therein a control mechanism which includes keys, actuated from outside, for activating a movement of the handling unit;

a closed planar handle frame connectable to the mounting structures and configured to allow an operator to actuate at least one of the keys with a thumb, wherein the handle frame includes a substantially horizontal first cross member having opposite axial ends, a pair of elongate grip elements in parallel relationship, one of the grip elements extending transversely to the first cross member and having one end detachably connected to one of the axial ends, and the other of the grip elements extending transversely to the first cross member and having one end detachably connected to other one of the axial ends, and a second cross member in parallel relationship to the first cross member and having axial ends, with one of the grip elements detachably connected with its other end to one of the axial ends of the second cross member, and the other of the grip elements detachably connected with its other end to other one of the axial ends of the second cross member; and connectors for detachably mounting the grip elements to the first and second cross members, each of the connectors having at least one protrusion for insertion in a complementary receptacle of the mounting structures, wherein the protrusion of one of the connectors projects in a same direction as the protrusion of each of the other connectors and extends in parallel relationship to the protrusion of each of the other connectors, wherein the cross members, the grip elements, the mounting structures and the connectors are selected from a plurality of cross members, grip elements, mounting structures and connectors of varying lengths to thereby establish a construction kit to allow construction of the handle frame with a desired configuration.

10. A modular construction kit for making a device for manually maneuvering a handling unit, comprising:

a plurality of mounting structures of varying configuration and configured for attachment to a handling unit, whereby some of the mounting structures have incorporated therein a control mechanism for activating a movement of the handling unit, and some of the mounting structures are devoid of a control mechanism;

a plurality of cross members of varying configuration;

a plurality of elongate grip elements of varying configuration;

a plurality of connectors of varying configuration for connecting a one of the cross members with two of the grip elements to thereby construct a handle frame of desired configuration; and a plurality of retainers configured for application with the cross members and releasably attaching a selected one of the cross members to a selected one of the mounting structures, wherein each of the retainers is configured to allow displacement of the selected cross member in axial direction and thereby effect a positional adjustment of the grip elements with respect to the keys, before securely fixing the cross member to the mounting structure.

11. The kit of claim 10, wherein each of the mounting structures is made of a hollow section having open axial ends and an open long side which defines a backside of the mounting structure, wherein the mounting structure includes a lid configured to close the open long side.

12. The kit of claim 11, wherein the lid is a metal strip.

13. The kit of claim 10, and further comprising a plurality of secondary control units configured for attachment to the mounting structures as to be displaceable in transverse and longitudinal directions, each said control unit provided for activating operating features of the handling unit.

14. The kit of claim 10, wherein each of the connectors has a substantially L-shaped configuration with one leg being curved so as to establish a handle frame with offset arrangement of a selected one of the cross members and the grip elements.

15. The kit of claim 10, wherein each of the connectors has a curved tubular member and a protrusion for insertion in a complementary receptacle of the mounting structures so as to establish a handle frame with arrangement of a selected one of the cross members and the grip elements in a common plane.

16. A device for manually maneuvering a handling unit, comprising:

at least one mounting structure configured for attachment to a handling unit;

a control mechanism connected to the mounting structure and including keys, actuated from outside, for activating a movement of the handling unit; and a handle frame connectable to the mounting structure and configured to allow an operator to actuate at least one of the keys with a thumb, wherein the handle frame includes at least one cross member having opposite axial ends, a pair of elongate grip elements, one of the grip elements extending transversely to the cross member and having one end detachably connected to one of the axial ends, and the other of the grip elements extending transversely to the cross member and having one end detachably connected to the other one of the axial ends, and fastening means for releasably attaching the handle frame to the mounting structure, wherein the fastening means includes a fastener configured to allow displacement of the cross member and thereby effect a positional adjustment of the grip elements with respect to the keys, before securely fixing the cross member to the mounting structure.

17. The device of claim 16, wherein the fastener has a tubular configuration with a horizontal cylindrical through-opening for passage and axial displacement of the cross member.

18. A modular construction kit for making a device for manually maneuvering a handling unit, comprising:

at least one mounting structure supporting a control mechanism for activating a movement of the handling unit;

a plurality of cross members of varying configuration;

a plurality of elongate grip elements of varying configuration;

a plurality of connectors of varying configuration for connecting a one of the cross members with two of the grip elements to thereby construct a handle frame of desired configuration; and a plurality of fasteners for allowing releasable attachment of a selected one of the cross members to the mounting structure, wherein each of the fasteners is configured to allow displacement of the selected cross member and thereby effect a positional adjustment of the grip elements with respect to the keys, before securely fixing the cross member to the mounting structure.

* * * * *